United States Patent [19]
Chu

[11] Patent Number: 5,972,139
[45] Date of Patent: Oct. 26, 1999

[54] METHOD OF PRODUCING THERMALLY SHRINKABLE AND ELECTROMAGNETIC WAVE PROOF TUBES AND PRODUCT THEREOF

[75] Inventor: Chung-Chiu Chu, Taipei, Taiwan

[73] Assignee: Chye Tay Co., Ltd., Taipei, Taiwan

[21] Appl. No.: 09/082,323

[22] Filed: May 21, 1998

[51] Int. Cl.$^6$ .............................. B65H 81/06; B32B 1/08; B32B 1/10

[52] U.S. Cl. ................................. 156/84; 156/52; 156/86; 174/DIG. 8; 428/34.9

[58] Field of Search .................................. 156/84, 86, 52; 174/DIG. 8; 428/34.9

[56] References Cited

U.S. PATENT DOCUMENTS

| | | | |
|---|---|---|---|
| 5,081,326 | 1/1992 | Usui ........................................... | 174/47 |
| 5,796,045 | 8/1998 | Lancien et al. ........................ | 156/86 X |

Primary Examiner—Francis J. Lorin
Attorney, Agent, or Firm—Bacon & Thomas

[57] ABSTRACT

A method is used to produce thermally shrinkable and electromagnetic wave proof tube and the product thereof which is internally or externally covered with a metallic net-like sleeve woven by soft zinc coated copper wires so as to make the electric cords arrangement in the tube neat, signal transmissions in a higher quality, appealing to eyes and durable against abrasion in use. The net-like sleeve can be woven by means of a weaving machine with different number of soft zinc-coated wires, such as 16, 24, 32 and 48 wires to obtain net-like sleeves of various densities and sizes. A so woven net-like sleeve is expandedly supported by a hollow metallic rod into shape and it can be adhered to the outer or inner surface of a thermally shrinkable tube. The metallic net-like sleeve can shrink along with the plastic tube when heated. It not only can neatly bind electric cords in a tube but also makes the tube appealing to eyes, durable against abrasion and anti-electromagnetic wave in practical operation.

4 Claims, 2 Drawing Sheets

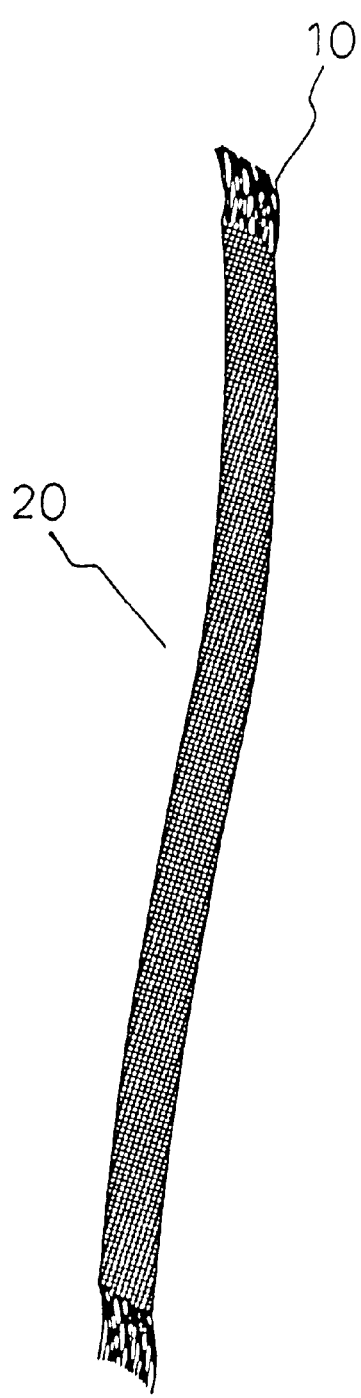
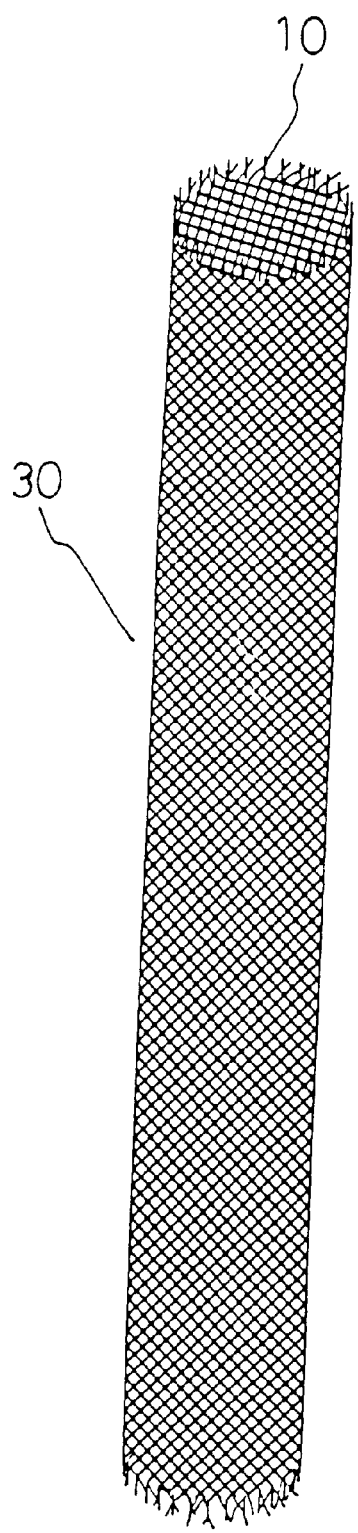
FIG. 1
FIG. 2

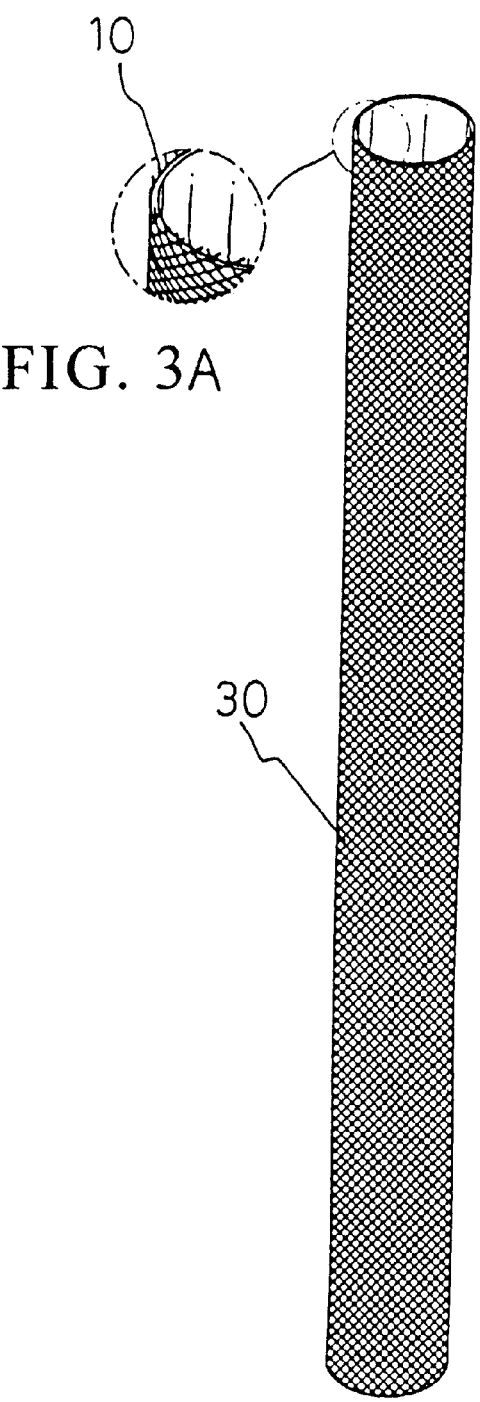
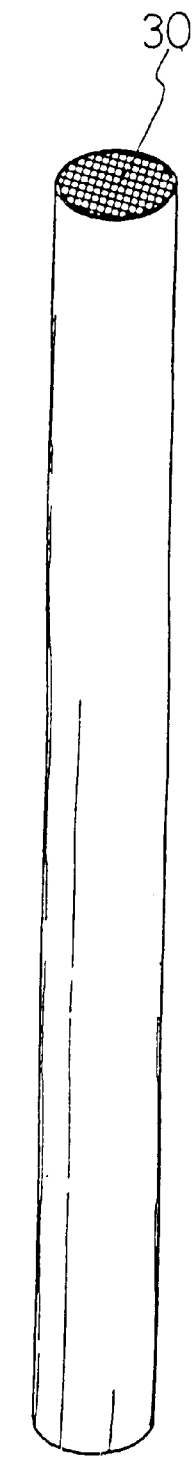
FIG. 3A
FIG. 3
FIG. 4

METHOD OF PRODUCING THERMALLY SHRINKABLE AND ELECTROMAGNETIC WAVE PROOF TUBES AND PRODUCT THEREOF

BACKGROUND OF THE INVENTION

The present invention relates to a method of producing thermally shrinkable and electromagnetic wave proof tube internally or externally covered with a metallic net-like sleeve woven by soft zinc coated copper wires so as to make the electric cords arrangement in the tube neat, signal transmissions in a higher quality, appealing to eyes and durable against abrasion in use. The net-like sleeve can be woven by means of a weaving machine with different number of soft zinc-coated wires, such as 16, 24, 32 and 48 wires to obtain net-like sleeves of various densities and sizes. A so woven net-like sleeve is expandedly supported by a hollow metallic tube into shape and it can be adhered to the outer or inner surface of a thermally shrinkable plastic tube. The metallic net-like sleeve can shrink along with the plastic tube when heated. It not only can neatly bind electric cords in a tube but also makes the tube appealing to eyes, durable against abrasion and anti-electromagnetic wave in practical operation.

A conventional method is used to produce hollow plastic tubes which are thermally shrinkable when heated so that electric power lines, signal cords and various wires can be integrally housed and neatly packed therein when heated. However, the prior art tubes are made of plastic material in a rather thin manner, thermal heating easily makes the thickness of the wall of such a tube unevenly distributed. The tubes can be broken out of friction or abrasion in practical use.

SUMMARY OF THE INVENTION

Therefore, the primary object of the present invention is to provide a method of producing a thermally shrinkable and electromagnetic wave proof tube covered with a metallic net-like sleeve woven by soft zinc-coated copper wires. The tubular net-like sleeve can be elastically expanded into various sizes suitable for attachment to thermally shrinkable tubes so as to protect electric cords or communication cables housed in the tube from being interfered by external electromagnetic waves in operation, making signal transmissions in a higher quality.

Another object of the present invention is to provide a thermally shrinkable and electromagnetic wave proof tube covered with a metallic net-like sleeve woven by soft zinc coated copper wires of different numbers so as to make the cable arrangement neat, appealing to eyes and durable against abrasion.

BRIEF DESCRIPTION OF THE DRAWINGS

FIG. 1 is a diagram showing a tubular net-like belt woven by soft zinc-coated copper wires;

FIG. 2 is a diagram showing a tubular net-like sleeve obtained by the belt as shown in FIG. 1 which is elastically expanded by a hollow tube;

FIG. 3 is a diagram showing the woven net-like sleeve being attached to the outer surface of a thermally shrinkable tube;

FIG. 3A is an enlarged diagram showing the detailed structure of FIG. 3;

FIG. 4 is a diagram showing the woven net-like sleeve being attached to the inner surface of a thermally shrinkable tube.

DETAILED DESCRIPTION OF THE PREFERRED EMBODIMENTS

The present invention relates to a method of producing thermally shrinkable and electromagnetic wave proof tube internally or externally covered with a metallic tubular net-like sleeve woven by soft copper wires coated with zinc. The used two materials are:
1. a thermally shrinkable hollow tube made of thermal plastic material and having diameters ranging from 3 mm, 4 mm, 5 mm, 6 mm, 8 mm . . . and so on.
2. zinc coated soft copper wires having diameters ranging from 0.16 mm, 0.18 mm, 0.20 mm, 0.22 mm, 0.23 mm . . . and so on.

The steps includes:

A. selecting soft copper wires in various amount of 16, 24, 32 and 48 respectively that are woven by way of a belt weaving machine to form a flat, tubular metallic net-like belt 20 of various sizes, as shown in FIG. 1, which is elastically expandable, and the diameter of said net-like belt 20 is variable when forces applied to the right and left end of said net-like belt 20, just like a shoe lace;

B. expanding the woven net-like belt 20 obtained in step A by inserting a properly selected hollow steel tube into the woven net-like belt to get a tubular net-like sleeve of a proper size, then withdrawing the hollow steel tube to obtain a hollow metallic net-like sleeve 30 of soft copper wire coated with zinc, as shown in FIG. 2;

C. inserting a solid rod into a thermally shrinkable plastic tube having a diameter slightly larger than the solid rod to get the soft plastic tube straightly extend;

D. engaging the expanded tubular net-like sleeve with the solid rod supported plastic tube externally and then pulling both the ends of the combination away from each other so as to make the tubular net-like sleeve shrink to tightly wrap around the external surface of the thermally shrinkable plastic tube, obtaining a plastic tube covered with a metallic net-like sleeve with a solid rod remained therein;

E. applying adhesive workable at room temperature or driable with ultraviolet ray to the surface of the metallic net-like sleeve wrapped around the thermally shrinkable tube with a solid rod remained therein;

F. removing the solid rod after the applied adhesive becoming dried so as to get a thermally shrinkable tube covered with a metallic net-like sleeve made of soft zinc coated copper wires, as shown in FIG. 3, which is electromagnetic wave proof in practical use.

In a second embodiment of the present invention, the metallic net-like sleeve is disposed inside the thermally shrinkable plastic tube instead of the outside thereof. The steps thereof are listed as follows:

A. selecting one of the above sized copper wires in various amount of 16, 24, 32 and 48 respectively that are woven by way of a belt weaving machine to form a flat, tubular metallic net-like belt 20 of various sizes, as shown in FIG. 1. which is elastically expandable, and the diameter of the net-like belt is variable when forces applied to the right and left end of the net-like belt 20, just like a shoe lace;

B. expanding the woven net-like belt 20 obtained in A by inserting a properly selected hollow steel tube into the woven net-like sleeve 20 to get a straight hollow metallic tubular net-like sleeve 30;

C. inserting a small rod having adhesive applied to the outer surface thereof into a hollow thermally shrinkable plastic tube so as to make the adhesive evenly distributed on the inner surface of the plastic tube;

D. inserting the metallic net-like sleeve having a hollow steel tube remained therein into the thermally shrinkable plastic tube already innerly coated with adhesive and fixing the sleeve in place so as to obtain a thermally shrinkable tube having a net-like sleeve attached thereto internally with the steel tube still remained therein;

E. replacing the hollow steel tube with a cylindrical tube having the same diameter as the thermally shrinkable plastic tube and rolling the cylindrical tube on a flat table so as to make the metallic net-like sleeve securely attached to the internal surface of the plastic tube;

F. withdrawing the cylindrical tube and getting the adhesive coated on the inner wall of the plastic tube dried to obtain a thermally shrinkable and electromagnetic wave proof tube having a net-like sleeve adhered to the inner wall thereof.

In summary, both the embodiments of the present invention produce thermally shrinkable and electromagnetic wave proof tube having the following common advantages:

1. The net-like sleeve woven by soft zinc coated copper wires has a shrinkage rate about 30%–50% after being heated.
2. The electrical properties of the woven net-like sleeve are better after thermally shrinked.
3. A plastic tube covered with a metallic sleeve has a better outer appearance and is durable against abrasion.
4. The woven net-like sleeve can effectively shelter electromagnetic waves in conformance to many national standards on anti-electromagnetic wave interference, such as FCC, CE, VCCI, CNS, . . .

What is claimed is:

1. A method of producing thermally shrinkable and electromagnetic wave proof tube externally covered with a metallic tubular net-like sleeve woven by soft copper wires coated with zinc, comprising the steps of:
    A. selecting soft copper wires in various amount of 16, 24, 32 and 48 respectively that are woven by way of a belt weaving machine to form a flat, tubular metallic net-like belt of various sizes, which is elastically expandable, and the diameter of said net-like belt is variable when forces applied to the right and left end of said net-like belt;
    B. expanding the woven net-like belt obtained in step A by inserting a properly sized hollow steel tube into the woven net-like belt to get a tubular net-like sleeve of a proper size, then withdrawing the hollow steel tube to obtain a hollow metallic net-like sleeve of soft copper wire coated with zinc;
    C. inserting a solid rod into a thermally shrinkable plastic tube having a diameter slightly larger than the solid rod to get the soft plastic tube straightly extend;
    D. engaging the expanded tubular net-like sleeve with the solid rod supported plastic tube externally and then pulling both the ends of the combination away from each other so as to make the tubular net-like sleeve shrink to tightly wrap around the external surface of the thermally shrinkable plastic tube, obtaining a plastic tube covered with a metallic net-like sleeve with a solid rod remained therein;
    E. applying adhesive workable at room temperature or driable with ultraviolet ray to the surface of the metallic net-like sleeve wrapped around the thermally shrinkable tube with a solid rod remained therein;
    F. removing the solid rod after the applied adhesive becoming dried so as to get a thermally shrinkable tube covered with a metallic net-like sleeve made of soft zinc coated copper wires which is electromagnetic wave proof in practical use.

2. A method as claimed in claim 1 wherein the steps thereof comprises:
    A. selecting soft copper wires in various amount of 16, 24, 32 and 48 that are woven by way of a belt weaving machine to form a flat, tubular metallic net-like belt which is elastically expandable, and the diameter of the net-like belt is variable when forces applied to the right and left end of the net-like belt;
    B. expanding a woven net-like belt obtained in step A by inserting a properly selected hollow steel tube into the woven net-like sleeve to get a straight hollow metallic tubular net-like sleeve;
    C. inserting a small rod having adhesive applied to the outer surface thereof into a hollow thermally shrinkable plastic tube so as to make the adhesive evenly distributed on the inner surface of the plastic tube;
    D. inserting the metallic net-like sleeve having a hollow steel tube remained therein into the thermally shrinkable plastic tube already innerly coated with adhesive and fixing the sleeve in place so as to obtain a thermally shrinkable tube having a net-like sleeve attached thereto internally with the steel tube still remained therein;
    E. replacing the hollow steel tube with a cylindrical tube having the same diameter as the thermally shrinkable plastic tube and rolling the cylindrical tube on a flat table so as to make the metallic net-like sleeve securely attached to the internal surface of the plastic tube;
    F. withdrawing the cylindrical tube and getting the adhesive coated on the inner wall of the plastic tube dried to obtain a thermally shrinkable and electromagnetic wave proof tube having a net-like sleeve adhered to the inner wall thereof.

3. A thermally shrinkable and electromagnetic wave proof tube produced according to the method as claimed in claim 1 for housing electric cords or cables therein wherein a thermally shrinkable plastic tube is externally covered with a metallic net-like sleeve woven by soft zinc-coated copper wires.

4. A thermally shrinkable and electromagnetic wave proof tube produced according to the method as claimed in claim 2 for housing electric cords or cables therein wherein a thermally shrinkable plastic tube is internally covered with a metallic net-like sleeve woven by soft zinc-coated copper wires.

* * * * *